US011354195B2

(12) United States Patent
Chopra et al.

(10) Patent No.: US 11,354,195 B2
(45) Date of Patent: Jun. 7, 2022

(54) SYSTEM AND METHOD FOR INTELLIGENT ASSET CLASSIFICATION

(71) Applicant: EMC IP Holding Company LLC, Hopkinton, MA (US)

(72) Inventors: Shelesh Chopra, Bangalore (IN); Sunil Yadav, Bangalore (IN); Manish Sharma, Bangalore (IN); Aaditya Rakesh Bansal, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 335 days.

(21) Appl. No.: 16/780,394

(22) Filed: Feb. 3, 2020

(65) Prior Publication Data

US 2021/0240569 A1 Aug. 5, 2021

(51) Int. Cl.
*G06F 7/04* (2006.01)
*G06F 11/14* (2006.01)
*G06F 21/62* (2013.01)
*H04N 7/16* (2011.01)

(52) U.S. Cl.
CPC ...... *G06F 11/1451* (2013.01); *G06F 21/6218* (2013.01)

(58) Field of Classification Search
CPC .......................... G06F 11/1451; G06F 21/6218
See application file for complete search history.

(56) References Cited

U.S. PATENT DOCUMENTS

| | | | | |
|---|---|---|---|---|
| 8,600,941 | B1* | 12/2013 | Raj | G06F 11/1466 |
| | | | | 707/640 |
| 9,275,060 | B1* | 3/2016 | Supekar | G06F 11/1451 |
| 9,781,163 | B2* | 10/2017 | Todd | G06F 21/6281 |
| 9,959,074 | B1* | 5/2018 | Shain | G06F 15/17331 |
| 10,067,836 | B1* | 9/2018 | Chopra | G06F 11/1451 |
| 10,127,391 | B1* | 11/2018 | Whitmer | G06F 21/602 |
| 10,216,432 | B1* | 2/2019 | Kulkarni | G06F 11/1464 |
| 10,223,206 | B1* | 3/2019 | Dobrean | G06F 11/1435 |
| 10,289,494 | B1* | 5/2019 | Chopra | G06F 11/1456 |
| 10,310,767 | B1* | 6/2019 | Chopra | G06F 9/45558 |
| 10,402,090 | B1* | 9/2019 | Tsaur | G06F 3/0649 |
| 10,409,495 | B1* | 9/2019 | Baruch | G06F 3/0608 |
| 10,430,293 | B1* | 10/2019 | Skowronski | G06F 11/1458 |
| 10,572,351 | B1* | 2/2020 | Bansal | G06F 9/45558 |
| 10,579,283 | B1* | 3/2020 | Chopra | G06F 3/065 |
| 10,581,751 | B1* | 3/2020 | Viswanathan | H04L 67/42 |
| 10,606,705 | B1* | 3/2020 | Janakiraman | G06F 11/1451 |
| 10,742,665 | B2* | 8/2020 | Gu | G06F 21/56 |
| 10,754,368 | B1* | 8/2020 | Chopra | G06F 11/3055 |
| 10,915,272 | B2* | 2/2021 | MacIntosh | G06F 3/0685 |
| 11,119,866 | B2* | 9/2021 | Behera | G06F 11/1451 |

(Continued)

*Primary Examiner* — Gary S Gracia
(74) *Attorney, Agent, or Firm* — Chamberlain, Hrdlicka, White, Williams & Aughtry

(57) ABSTRACT

Techniques described herein relate to a methods and systems for asset classification, which may include: identifying, in a backup domain, a first asset and a second asset; performing a first analysis of the first asset to determine a set of first asset characteristics; performing a second analysis of the second asset to determine a set of second asset characteristics; creating a first asset group based on the first analysis and the second analysis, the first asset group comprising the first asset and the second asset; and assigning a first backup policy to the first asset group.

20 Claims, 5 Drawing Sheets

(56) References Cited

U.S. PATENT DOCUMENTS

| | | | |
|---|---|---|---|
| 11,164,115 B1* | 11/2021 | Todd | H04L 9/3297 |
| 2007/0271316 A1* | 11/2007 | Hollebeek | G16H 30/20 |
| 2012/0117029 A1* | 5/2012 | Gold | G06F 11/1469 |
| | | | 707/651 |
| 2013/0086000 A1* | 4/2013 | Mostachetti | G06F 11/1464 |
| | | | 707/654 |
| 2014/0325670 A1* | 10/2014 | Singh | G06Q 50/184 |
| | | | 726/26 |
| 2018/0260124 A1* | 9/2018 | Schucker | G06F 11/1469 |
| 2018/0300210 A1* | 10/2018 | Feng | G06F 11/203 |
| 2021/0240569 A1* | 8/2021 | Chopra | G06F 21/6218 |
| 2022/0058743 A1* | 2/2022 | Brandmaier | G06Q 40/08 |

* cited by examiner

SYSTEM AND METHOD FOR INTELLIGENT ASSET CLASSIFICATION

BACKGROUND

Data protection services are sometimes provided for computing devices (e.g., nodes) that store data. Such data may exist as all or portions of logical groupings of data, which may be referred to as assets. However, the backup policies to implement such data protection services are often assigned per node. For nodes hosting more than one asset and/or portion of an asset, implementation of backup policies at the node level does not allow different assets or portions of assets stored on a given node to have different backup policies. Additionally, a given asset (e.g., a database) may be divided into portions and stored on multiple nodes. In such a scenario, if the nodes have differing backup policies (e.g., some nodes are configured to backup hourly to cloud storage, while others are configured to backup weekly to tape storage), then the backup of the asset may not be a consistent or coherent copy of the asset. If the asset's backup copy is inconsistent or not coherent (e.g., it is not a valid copy of the entire asset at a given point in time), then problems may arise when attempting, for example, to restore the asset from the backup copy to achieve a disaster recovery.

SUMMARY

In general, embodiments described herein relate to a method for asset classification. In one or more embodiments, the method includes identifying, in a backup domain, a first asset and a second asset; performing a first analysis of the first asset to determine a set of first asset characteristics; performing a second analysis of the second asset to determine a set of second asset characteristics; creating a first asset group based on the first analysis and the second analysis, the first asset group comprising the first asset and the second asset; and assigning a first backup policy to the first asset group.

In general, embodiments described herein relate to a non-transitory computer readable medium that includes computer readable program code, which, when executed by a computer processor, enables the computer processor to perform a method for asset classification. In one or more embodiments, the method includes identifying, in a backup domain, a first asset and a second asset; performing a first analysis of the first asset to determine a set of first asset characteristics; performing a second analysis of the second asset to determine a set of second asset characteristics; creating a first asset group based on the first analysis and the second analysis, the first asset group comprising the first asset and the second asset; and assigning a first backup policy to the first asset group.

In general, embodiments described herein relate to a system for asset classification. In one or more embodiments, the system includes a processor; a memory device; a non-volatile storage device; and an asset management agent executing on the processor. In one or more embodiments, the asset management agent includes functionality to identify, in a backup domain, a first asset and a second asset; perform a first analysis of the first asset to determine a set of first asset characteristics; perform a second analysis of the second asset to determine a set of second asset characteristics; create a first asset group based on the first analysis and the second analysis, the first asset group comprising the first asset and the second asset; and assign a first backup policy to the first asset group.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
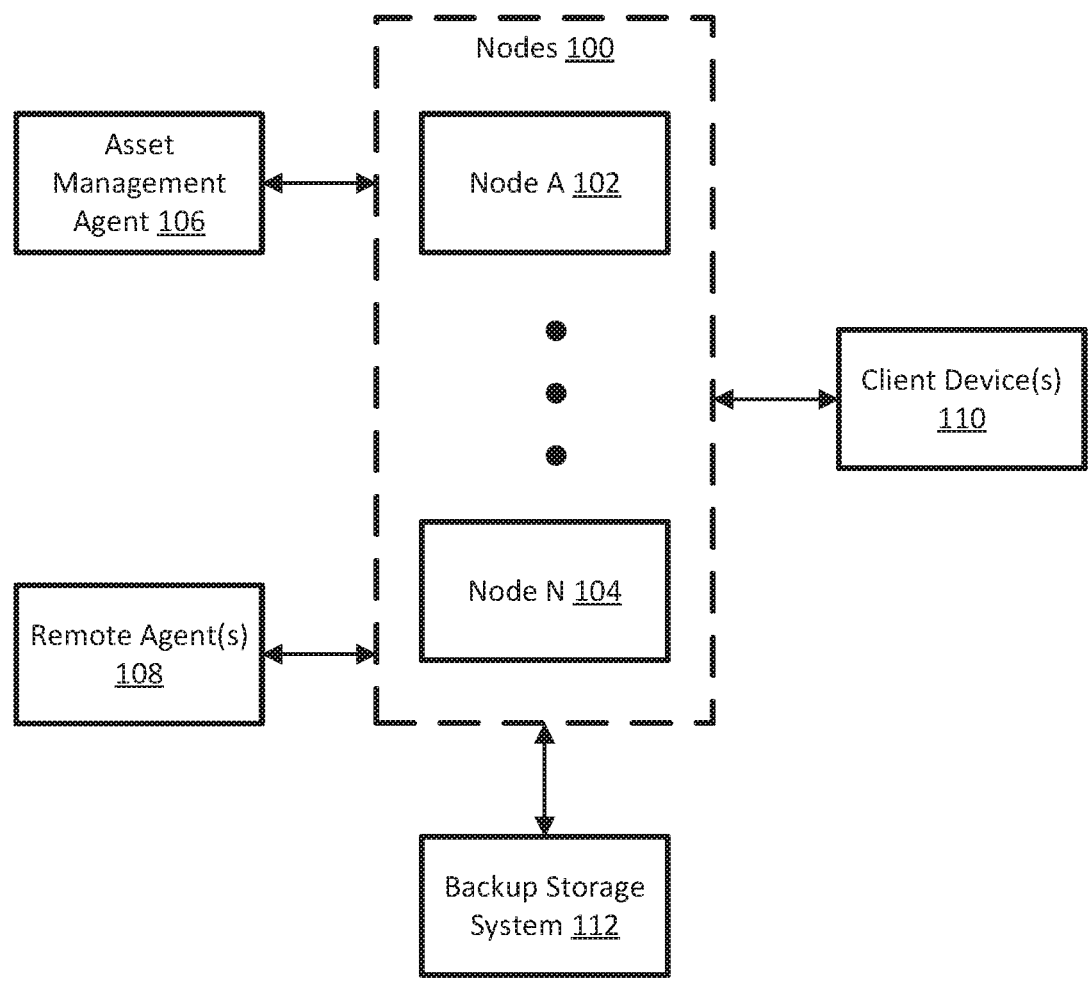
FIG. 1 shows a diagram of a system in accordance with one or more embodiments of the invention.

Specific embodiments will now be described with reference to the accompanying figures.

In the below description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments of the invention relate to categorizing data assets (e.g., databases, file systems (or any portions therein), storage volumes, data repositories, etc.) based on various characteristics of each asset. In one or more embodiments, any number of assets exist in a backup domain. In one or more embodiments, a backup domain is any set of computing devices (i.e., nodes) storing data in any format that are backed up to a common backup solution that includes storage for backing up the data, or any portion thereof, of the computing devices in the backup domain.

In one or more embodiments, the assets stored in the backup domain are identified. In one or more embodiments, some of the assets may be stored on a single node and other assets may span multiple nodes (e.g., a database that is stored in portions on several nodes in the backup domain).

In one or more embodiments, each of the assets are analyzed to determine various characteristics of each asset (e.g., data access rate, data density, etc.).

In one or more embodiments, one or more job components are created for each asset. Specifically, in one or more embodiments, if the asset is stored on a single node, then a single job component is created for the asset, and if the asset is divided into portions stored on multiple nodes, then a job component is created for each of the portions on the different nodes. In one or more embodiments, the job components inherit the characteristics of their parent asset discovered during the above-described analysis of the assets in the backup domain.

In one or more embodiments, once the job components have been created, they are grouped together based on the set of characteristics for the assets. Specifically, in one or more embodiments, the one or more job components created for each of the assets will have a set of characteristics based on the analysis of the parent asset. The characteristics are then examined to discover similarities between the characteristics of the various job components. In one or more embodiments, job components having similar characteristics are placed in the same group.

For example, there may be one set of job components whose parent asset was marked mission critical by a user, a second set of job components that have similarly high data density and data access rates, and a third asset that has relatively low data density and data access rates. In such a scenario, three groups may be created, with each of the groups having one of the set of job components having similar characteristics. In one or more embodiments, grouping job components based on characteristics of the parent assets also ensures that job components for portions of assets that span multiple nodes are grouped together.

Next, in one or more embodiments, the groups are given a relative priority ranking based on the characteristics of the job components in the group. For example, the mission critical group may be assigned the highest relative priority, the high data density and data access rate group may be assigned the second highest relative priority, and the low data density and low data access rate group may be assigned the lowest relative priority.

Next, in one or more embodiments, the asset groups are assigned backup policies based on their relative priorities. For example, the highest priority group might be assigned a backup policy that dictates that backup should happen hourly to cloud storage, the second highest priority group might be assigned a backup policy that dictates that backup should occur daily to remote backup storage, and the lowest priority group might be assigned a backup policy that dictates that backup should occur weekly and to archivable tape storage.

In one or more embodiments, once the backup policies have been assigned to the groups, each node in the backup domain is provided with the set of backup policies that are to be applied to the assets and/or portions of assets stored on the node. In one or more embodiments, the nodes then perform backups according to the backup policies.

In one or more embodiments, the intelligent classification of assets based on asset characteristics enables assets that span multiple nodes to be backed up in a consistent and coherent manner. In one or more embodiments, intelligent classification of assets also allows a given node to utilize different backup policies (e.g., backup timing and storage type) for different assets and/or asset portions stored on the node, rather than applying the same backup policy for the entire node, which allows for more granular and optimal use of backup technologies by a node. Additionally, in one or more embodiments, the asset classification and assignment of backup policies can be performed automatically, thereby eliminating the need for a customer to manually specify backup policies within a backup domain. Instead, in one or more embodiments, a user may enable (or not) the intelligent classification feature within the backup domain for all or any portion of the assets therein, and may also define parameters (e.g., minimum requirements) that a backup policy applied to an asset must comply with.

FIG. 1 shows a diagram of a system in accordance with one or more embodiments of the invention. The system may include any number of nodes (100) (e.g., node A (102), node N (104)), an asset management agent (106), any number of remote agents (e.g., remote agent(s) (108)), and a backup storage system (112). Additionally, the system may be operatively connected to any number of clients (e.g., client device(s) (110)).

In one or more embodiments, nodes (100) are computing devices. In one or more embodiments, a computing device is any device or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (not shown), one or more physical interfaces (e.g., network ports, storage ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a storage device (e.g., a disk drive array, a fibre channel storage device, an iSCSI storage device, a tape storage device, a flash storage array, a network attached storage device, etc.), a network device (e.g., switch, router, multi-layer switch, etc.), a virtual machine, a logical container (e.g., for one or more applications), and/or any other type of computing device with the aforementioned requirements. In one or more embodiments, any of all of the aforementioned examples may be combined to create a system of such devices. Other types of computing devices may be used without departing from the scope of the invention.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. Circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, the nodes (100) are part of a backup domain. In one or more embodiments, a backup domain is a set of nodes for which backup policies are to be applied. Such backup policies may be applied to have backup copies of data that can be used to restore data in the event of a node failure, for disaster recovery services, etc.

In one or more embodiments, the nodes (100) in a backup domain store any number of assets (not shown). In one or more embodiments, an asset is a data structure or set of data structures that make up a logical unit of data to be backed up by application of backup policies.

In one or more embodiments, an asset may be wholly stored on a single node (e.g., node A (102)). For example, an asset may be a storage volume on a node, a portion of a storage volume on a node, multiple storage volumes on a node, portions of multiple storage volumes on a node, one or more partitions of a storage volume on a node, a portion of a file system on a node, etc.

In one or more embodiments, an asset spans multiple nodes. For example, an asset may be divided in to any number of portions, and each portion may be stored on a separate node in the backup domain.

Examples of assets include, but are not limited to, a file system on a one or more volumes of one or more nodes, a particular folder within a file system, a database, a virtual machine, a logical container, an email repository, a document repository, a transaction repository, a content repository, a sensor data repository, a source code repository, etc. Nodes (100) may store assets of types different from the aforementioned non-limiting examples without departing from the scope of the invention.

In one or more embodiments, the nodes (100) are operatively connected to an asset management agent (106), a backup storage system (112) and, optionally, a remote agent(s) (108) and client device(s) (110).

In one or more embodiments, a backup domain includes or is operatively connected to an asset management agent (106). In one or more embodiments, an asset management agent (106) is any hardware (e.g., circuitry), software, firmware, or any combination thereof that includes functionality to manage, at least in part, assets for the purposes of providing data protections services (e.g., backup, disaster recovery, etc.). For example, an asset management agent (106) may be one or more processes executing on one or more processors of one or more computing devices. In one or more embodiments, an asset management agent (106) includes functionality to identify assets in a backup domain, to characterize the assets using a set of asset characteristics associated with and/or measured for a given asset. Such characteristics may include, but are not limited to, all or any portion of the following: operating system on the node hosting the asset or one or more operating systems on nodes hosting portions of the asset if it spans multiple nodes; any backup policies that may be configured on the nodes storing the asset of a portion of the asset; whether the asset has been marked in some way as being high priority or mission-critical; data access rate for asset; memory usage for the asset; data density (e.g., number of files per gigabyte (GB)); storage usage for the asset; processor use for the asset; services the asset is intended to provide (e.g., to clients, customers, users, etc.), and any quality of service level that is to be provided to the asset. Other characteristics may be obtained by analyzing an asset without departing from the scope of the invention. In one or more embodiments, an asset management agent (106) also includes functionality to create job components for assets stored on a single node and multiple job components for assets that span multiple nodes. In one or more embodiments, the asset management agent (106) also includes functionality to group the job components based on the characteristics of the asset for which the job components were created, to assign backup policies to the groups, and to provide, directly or indirectly, backup policies to the nodes (100) so that each node may apply the assigned backup polies to the assets or portions of assets stored thereon.

In one or more embodiments, the backup domain also includes and/or is operatively connected to any number of remote agents (108). In one or more embodiments, a remote agent (108) is any hardware (e.g., circuitry), software, firmware, or any combination thereof that includes functionality to manage, at least in part, one or more nodes for the purposes of providing data protections services (e.g., backup, disaster recovery, etc.). For example, a remote agent (108) may be one or more processes executing on one or more processors of one or more computing devices. In one or more embodiments, a remote agent (108) may or may not execute on the same computing device or set of computing devices as the asset management agent (106). A remote agent (108) may serve a single node or a set of nodes within a backup domain. In one or more embodiments, a remote agent (108) includes functionality to receive sets of backup policies for assets or portions of assets on a given node, and to provide the same to the node so that the node may backup assets or portions of assets according to the differing backup policies.

In one or more embodiments, any or all of the nodes (100) may (or may not) be operatively connected to any number of client devices (110). In one or more embodiments, a client device (110) is any computing device or set of computing devices that access any one or more of the assets stored on the nodes (100) of the backup domain. For example, a client device may be a computing device of a user seeking to access a database asset of the nodes (100), a document repository asset of the nodes (100), etc.

In one or more embodiments, the backup domain also includes a backup storage system (112). In one or more embodiments, a backup storage system (112) is any computing device or set of computing device to which assets may be backed up on storage of the backup storage system (112). For example, a backup storage system may include a set of servers operatively connected to any number of storage devices. As another example, a backup storage system (112) may be a cloud storage solution. As another example, a backup storage system may be a set of tape storage devices. The backup storage system may be other types of storage and other devices without departing from the scope of the invention. In one or more embodiments, the backup storage system includes a variety of storage types for storing assets having relatively higher or lower priorities. For example, lower priority assets may be stored on tape storage, while higher priority assets are stored on cloud storage. In one or more embodiments, a backup storage system (112) is capable of accepting backup copies of assets, or portions of assets, according to any recurring time schedule (e.g., hourly, daily, weekly, bi-monthly, etc.)

While FIG. 1 shows a configuration of components, other configurations may be used without departing from the scope of embodiments described herein. For example, there may be any number of asset management agents. As another example, there may be any number of remote agents, or none. As another example, there may be any number of nodes, each having any number of assets or portions of assets. As another example, there may be any number of components, software instances, etc. that are not shown in FIG. 1. Accordingly, embodiments disclosed herein should not be limited to the configuration of components shown in FIG. 1.

Figure 2:
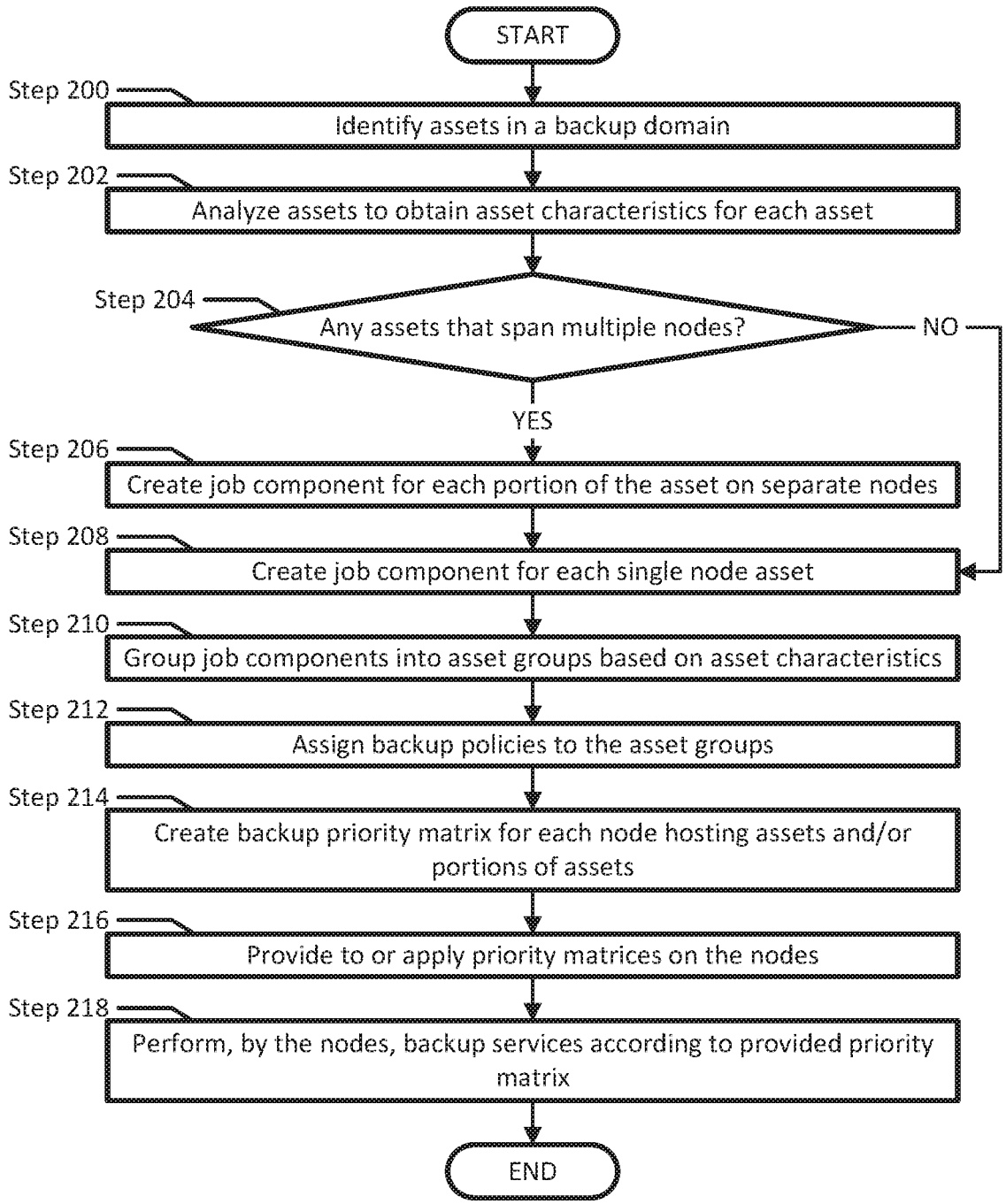
FIG. 2 shows a flowchart in accordance with one or more embodiments of the invention.

FIG. 2 shows a flowchart describing a method for intelligent asset classification in accordance with one or more embodiments disclosed herein.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 200, assets in a backup domain are identified. In one or more embodiments, the assets are identified by an asset management agent. In one or more embodiments, assets may be identified using any scheme for identification of logical units of one or more data structures (i.e., assets). For example, a list of assets in a backup domain may be provided by an administrator. As another example, an asset management agent may examine assets and portions of assets on the nodes in the backup domain, and use identifiers to determine what assets are stored therein. As another example, a set of remote agents managing, at least in part, the nodes of a backup domain may transmit information about the assets stored on the nodes to the asset management agent, which uses the information to identify the assets in the backup domain.

In Step 202, each asset in the backup domain is analyzed to obtain a set of characteristics for each asset. Examples of asset characteristics are discussed above in the description of FIG. 1. An asset management may obtain a set of characteristics for a given asset by requesting information from the nodes, requesting information from one or more remote managers, being sent asset characteristic information on a periodic basis from the nodes and/or the remote agents, etc. Other methods of obtaining information relating to characteristics of assets may be used without departing from the scope of this invention.

In Step 204, a determination is made as to whether any asset spans multiple nodes. In one or more embodiments, if any asset(s) span multiple nodes, the method proceeds to Step 206. In one or more embodiments, if no assets span multiple nodes, the method proceeds to Step 208.

In Step 206, a job component is created for each portion of an asset stored on a different nodes. In one or more embodiments, the job components are created by an asset management agent. In one or more embodiments, a job component is a representation of an asset or, in this case, a portion of an asset that can be used by an asset management agent to perform certain functionality, such as grouping the job components (discussed further below in the description of Step 210). In one or more embodiments, a job component is created for each node spanned by a node-spanning asset. In one or more embodiments, each job component for a portion of an asset is associated with the characteristics of the parent asset that includes the portions. After creating multiple job components for each asset that spans multiple nodes, the method proceeds to Step 208.

In Step 208, a job component is created for each asset in the backup domain that is stored on a single node. In one or more embodiments, the job components are created by an asset management agent. In one or more embodiments, the job components are associated with the characteristics of the assets for which they were created.

In Step 210, the job components are grouped based on their associated characteristics. The grouping may be based on any or all of the sets of characteristics associated with the job components. For example, all job components created for an asset that a user designated as high priority may be grouped together. As another example, job components with a use one or more hardware resources (e.g., memory, processors, storage space, etc.) above a certain threshold, or relatively more than other job components by a certain amount, may be grouped together.

When grouping the job components, the different operating systems of the nodes storing the assets for which the job components were create may be considered. For example, an asset management agent may be configured to understand what various operating systems are capable of implementing different sets of backup policies (e.g., older operating systems may not be capable of implementing all the backup policies that a newer operating system is capable of implementing).

As another example, when grouping job components, an asset management agent may consider the backup policies initially assigned to the various nodes storing the assets for which the job components were created, which may affect what type of backup policy is applied to a group of job components having one or more similar characteristics.

As another example, when grouping job components, an asset management agent may consider the backup policy parameters (e.g., a user says a given asset must be backed up at least daily, must be backed up to cloud storage, etc.) initially assigned to the various nodes storing the assets for which the job components were created, which may affect what type of backup policy is applied to a group of job components having one or more similar characteristics.

In one or more embodiments, any combination of characteristics may be used to group job components. For example, all job components having a certain minimum generation of an operating system, having a data access rate above a threshold, having a data density above a threshold, and that use memory above a threshold may be grouped together. Any number of job component groups may be created without departing from the scope of the invention. In one or more embodiments, because the job components for assets that span multiple nodes have a common set of characteristics (derived from the same parent asset), they end up in the same group, which may ensure they are assigned the same backup policy, thereby increasing the probability that the asset as a whole is backed up to backup storage in a consistent and coherent manner.

In one or more embodiments, if the assets in the backup domain stored on a given node are all single node assets, characteristics of the assets may be used to generate a relative weight for at least some of the characteristics for that particular node. For example, if a node stores two assets, the relative weight of the data density of the one asset may be 0.8, and the other asset 0.2.

In Step 212, backup policies are assigned to the asset groups that were created with the job components in Step 210. In one or more embodiments, a backup policy is a set of rules relating to the backup of assets to backup storage. Examples of such rules include, but are not limited to: backup generation schedule/timing; level of redundancy; number of separate backup copies; type of storage on which to store backup copies; retention time of backup copies; backup storage tier migration (e.g., first to cloud storage, then to remote storage facility); any portion of an asset to exclude from backups; backup scheme characteristics (e.g., backup image of entire volume, file based backup with information on the individual files included, etc.).

In Step 214, a backup priority matrix is created for each node storing assets and/or portions of assets. In one or more embodiments, the groups of job components are assigned a relative priority rank based on any of the characteristics of the job components and/or the backup policies assigned to the group. In one or more embodiments, the various job components and/or portions of job components on a given node are associated with the various backup policies assigned to the asset groups that the job components were placed in in Step 210, thereby creating a priority matrix each of the nodes.

In Step 216, the priority matrices created in Step 214 are provided to and/or applied on the nodes for which the priority matrices were created. In one or more embodiments, the priority matrices are used when the nodes perform backup services for the various assets or portions of assets stored thereon. For example, a remote agent for a given node may use the priority matrix for that node to direct the node how to prioritize the backup of the various job components for the assets and portions of assets stored on the node. As another example, the priority matrix for a node may be provided directly to the node, which may be configured to use the priority matrix to properly prioritize execution of backup services. In one or more embodiments, a priority matrix for a node is necessary when a node lacks sufficient resources to concurrently perform all the backup services dictated by the various backup policies for its stored assets and/or portions of assets.

In Step 218, the nodes perform backup services according to the backup policies assigned to each job component for assets or portions of assets stored on the nodes, taking into account the relative priorities expressed in the priority matrix for the node. For example, a given node may store seven assets and five portions of parent assets, leading to twelve job components for the assets and portions of assets. The twelve assets and portions of assets may have been assigned to three different groups in Step 210, and have three different backup policies assigned, which the node must execute to provide backup services for the various assets and portions of assets. Further, the node (or a remote agent) may consult the priority matrix to determine the relative priority of the three groups of assets and portions of assets it is storing, and perform the backup services in an order dictated therein.

Figure 3:
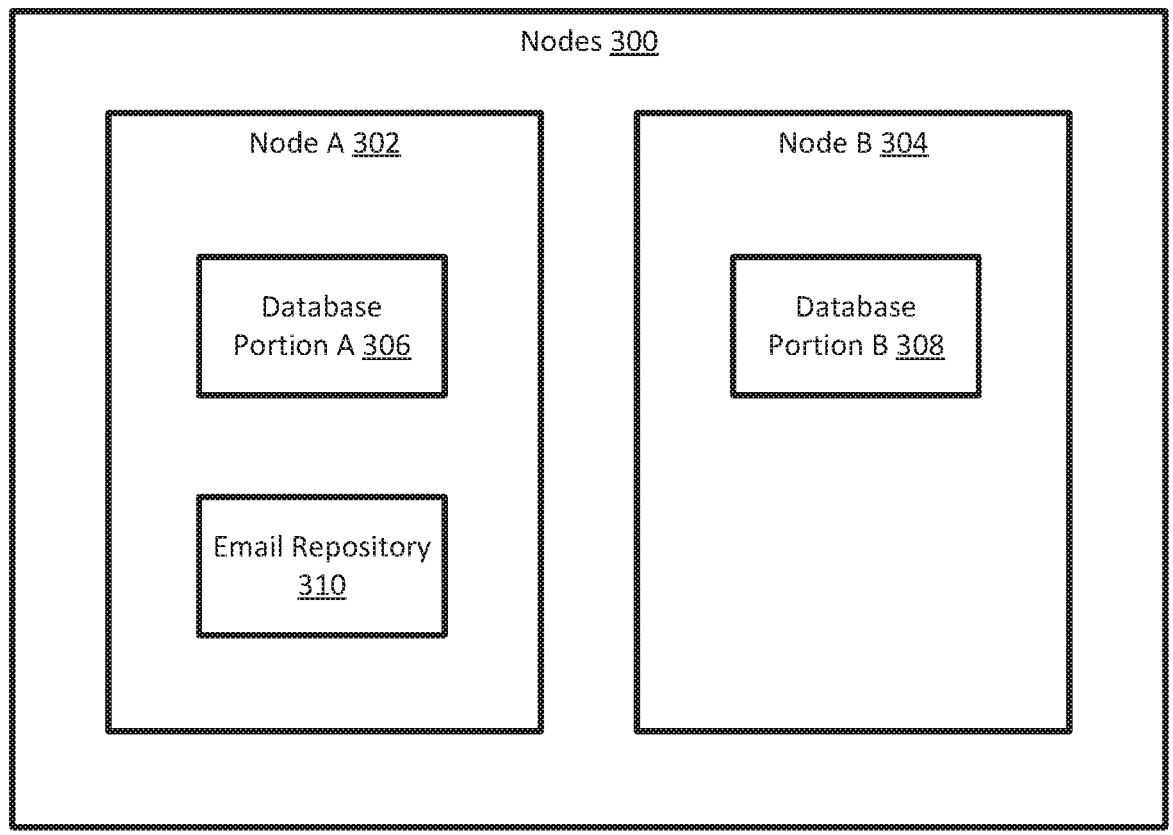
FIG. 3 shows an example in accordance with one or more embodiments of the invention.

FIG. 3 shows an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example.

Referring to FIG. 3, consider a scenario in which a backup domain, such as that discussed above in the description of FIG. 1 and FIG. 2, includes nodes (300). Specifically, the backup domain includes node A (302) and node B (304), each of which are rack servers with on-board storage for storing assets. More specifically, the nodes (300) store two assets, a database asset spanning node A (302) (shown as database portion A (306) and database portion B (308)) and node B (304), and a single node email repository (310) asset stored on node A (302). The nodes are operatively connected to an asset management agent (not shown), one remote agent per node (not shown), clients (not shown) that access the database asset and the email repository, and a backup storage system (not shown) that includes both cloud storage and a fibre channel storage array.

In such a scenario, an asset management agent (not shown) is configured to manage the two assets backup policies. To that end, the asset management agent first identifies that the two assets exist and are stored on the two nodes (302, 304) of the backup domain.

Next, the asset management agent assesses a set of characteristics for the two assets. In this example, the characteristics of file system access rate, overall resource usage, and user assigned relative importance are the characteristics that are obtained for each asset. For the database asset (306, 308) the file system access rate is above a pre-defined threshold, and is thus classified as high for that characteristic, and the email repository (310) asset is below a pre-defined threshold, and thus is classified as low for that characteristic. For the database asset (306, 308) the overall resource usage rate is above a pre-defined threshold, and is thus classified as high for that characteristic, and the email repository (310) asset is within a pre-defined range, and thus is classified as moderate for that characteristic. For the database asset (306, 308) the user assigned priority is high priority, and is thus classified as high for that characteristic, and the email repository (310) asset is assigned a priority of moderate, and thus is classified as moderate for that characteristic.

Next, job components are created for each asset or asset portion stored on the nodes (300). Because the database asset is split into two portions (306, 308) spanning two nodes (302, 304), two job components are created, one for each node. Because the email repository (310) is a single node asset, one job component is created for the email repository asset. The job components are assigned characteristics based on the characteristics of the asset for which they were created.

Based on the above-described assessment of certain characteristics of the two assets, the asset management agent groups the three job components into two groups. The first group includes the two job components created for the two portions (306, 308) of the database asset, as they share the same characteristics. The second group includes the job component for the email repository (310), which has characteristics sufficiently different than the database asset job components as to require being in a separate group.

Next, the asset management manager assigns a backup policy to the first group that includes that the asset portions associated with the job components in the first group should be backed up hourly to cloud storage. The asset management manager assigns a backup policy to the second group that includes that the asset associated with the job component in the second group should be backed up daily to fibre channel storage.

Next, the asset management agent assigns the first group a relative priority of one, and the second group a relative priority of two, thereby indicating that the first group is has a higher priority relative to the second group. Next, a priority matrix is created for the nodes (302, 304). The priority matrix for node A (302) indicates that node A (306) should prioritize performing the backup of database portion A (306) over performing the backup of the email repository (310). The priority matrix for node B (304) only includes the entry for database portion B (308), so node B (304) performs the backup of database portion B (308) in accordance with the backup policy assigned to the group that the job component for database portion B is in.

Next, the asset management communicates the backup policy assignments and the priority matrices to the remote agents managing the two nodes (302, 304). The remote agent for node A thus directs node A to perform a backup of database portion B every hour to cloud storage, to perform a backup of the email repository once per day to the fibre channel array of the backup storage system, and that if the two backups ever end up scheduled to overlap, that node A should give priority to performing the backup of database portion A.

Figure 4:
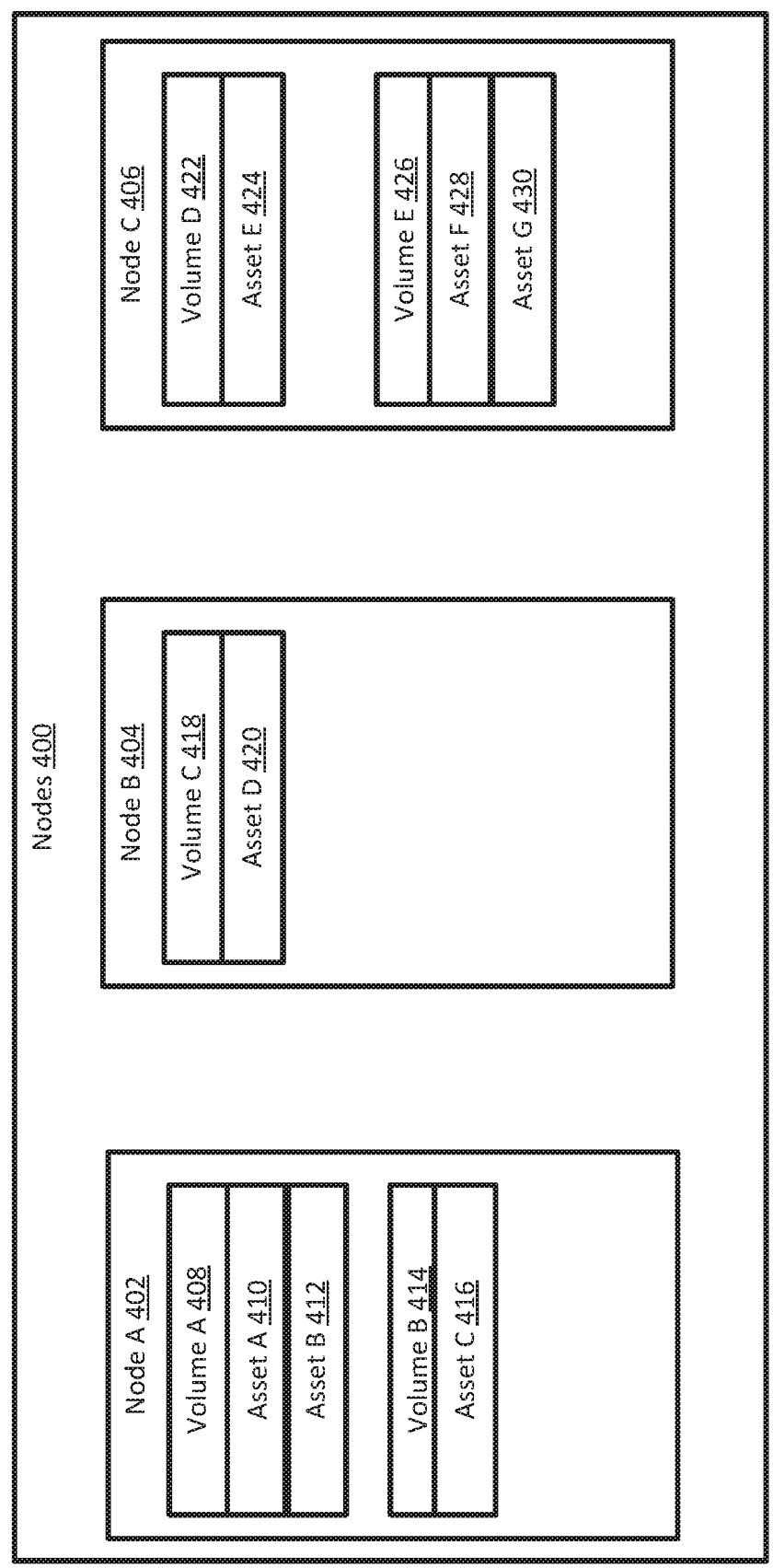
FIG. 4 shows an example in accordance with one or more embodiments of the invention.

FIG. 4 shows an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example.

Referring to FIG. 4, consider a scenario in which a backup domain includes three nodes (400), node A (402), node B (404), and node C (406). Node A (402) includes volume A (408), which includes asset A (410) and asset B (412), and volume B (414), which includes asset C (416). Node B (404) includes volume C (418), which includes asset D (420). Node C (406) includes volume D (422), which includes asset E (424), and volume E (426), which includes asset F (428) and asset G (430). In this scenario, all of the assets are single node assets. Node A (402) and node C (406) have Windows Server 2019 as an operating system and a volume based backup policy configured. Node A has high memory usage, and node C has low memory usage. Node B (404) has Red Hat Enterprise Linux 8.1 as an operating system, file based backup configured, and low memory usage. The nodes are operatively connected to an asset management agent (not shown), one remote agent per node (not shown), clients (not shown) that access the database asset and the email repository, and a backup storage system (not shown) that includes cloud storage, an iSCSI storage array, and tape storage.

In such a scenario, an asset management agent (not shown) is configured to manage the backup policies for the seven assets. To that end, the asset management agent first identifies that the seven assets exist and are stored on the three nodes (402, 404, 406) of the backup domain.

Next, the asset management agent assesses a set of characteristics for the seven assets. In this example, the characteristics of data density (in number of files per GB), data access rate, and memory usage are the characteristics that are obtained for each asset. These characteristics are obtained for each asset, and then converted into a relative weight for the node on which the asset resides. The results are then used to compute a relative priority, and a backup policy type best suited for the asset. The computed values are then used to assign job components created for each of the assets to groups. The following table, which names the job components based on node-volume-asset (e.g., A-A-A for node A-volume A-asset A) shows the results:

TABLE 1

Asset Characteristic Analysis

| Job Component | Data Density Weight | Data Access Rate Weight | Computed Priority | Computed Backup Policy | Computed Group |
|---|---|---|---|---|---|
| A-A-A | 0.8 | 0.7 | high | file based | G1 |
| A-A-B | 0.2 | 0.1 | low | volume based | G3 |
| A-B-C | 0.3 | 0.6 | medium | volume based | G2 |
| B-C-D | 0.5 | 0.3 | low | volume based | G3 |
| C-D-E | 0.4 | 0.9 | high | file based | G1 |
| C-E-F | 0.7 | 0.1 | low | volume based | G3 |
| C-E-G | 0.8 | 0.6 | high | file based | G1 |

Based on the analysis represented by Table 1, three groups are created and assigned backup policies that include backup timing and storage type, as shown in the following table:

TABLE 2

Group Backup Policy Assignments

| Group | Job Component(s) | Associated Nodes | Backup Timing | Storage Type |
|---|---|---|---|---|
| G1 | A-A-A; C-D-E; C-E-G | A, C | Hourly | Cloud |

TABLE 2-continued

Group Backup Policy Assignments

| Group | Job Component(s) | Associated Nodes | Backup Timing | Storage Type |
|---|---|---|---|---|
| G2 | A-B-C | A | Daily | iSCSI |
| G3 | A-A-B; B-C-D; C-E-F | A, B, C | Alternate Days | Tape Storage |

Based on the assignments for the groups represented by Table 2, the priority matrix for node A (402) indicates that the priority order for performing backups should be asset A of volume A, then asset C of volume B, then asset B of volume A. Node B (404) only has one asset, so the asset (asset D) thereon (in volume C) should be backed up according to the backup policy that dictates backup to tape storage on alternate days. Based on the assignments for the groups represented by Table 2, the priority matrix for node C (406) indicates that the priority order for performing backups should be asset E of volume D and asset G of volume E (i.e., asset E and asset G have the same relative priority), then asset F of volume E. Accordingly, the remote agents for each of the three nodes use the above-described information provided by the asset management agent based on the characteristics of the seven assets in the backup domain to direct the backup services performed by the three nodes.

Figure 5:
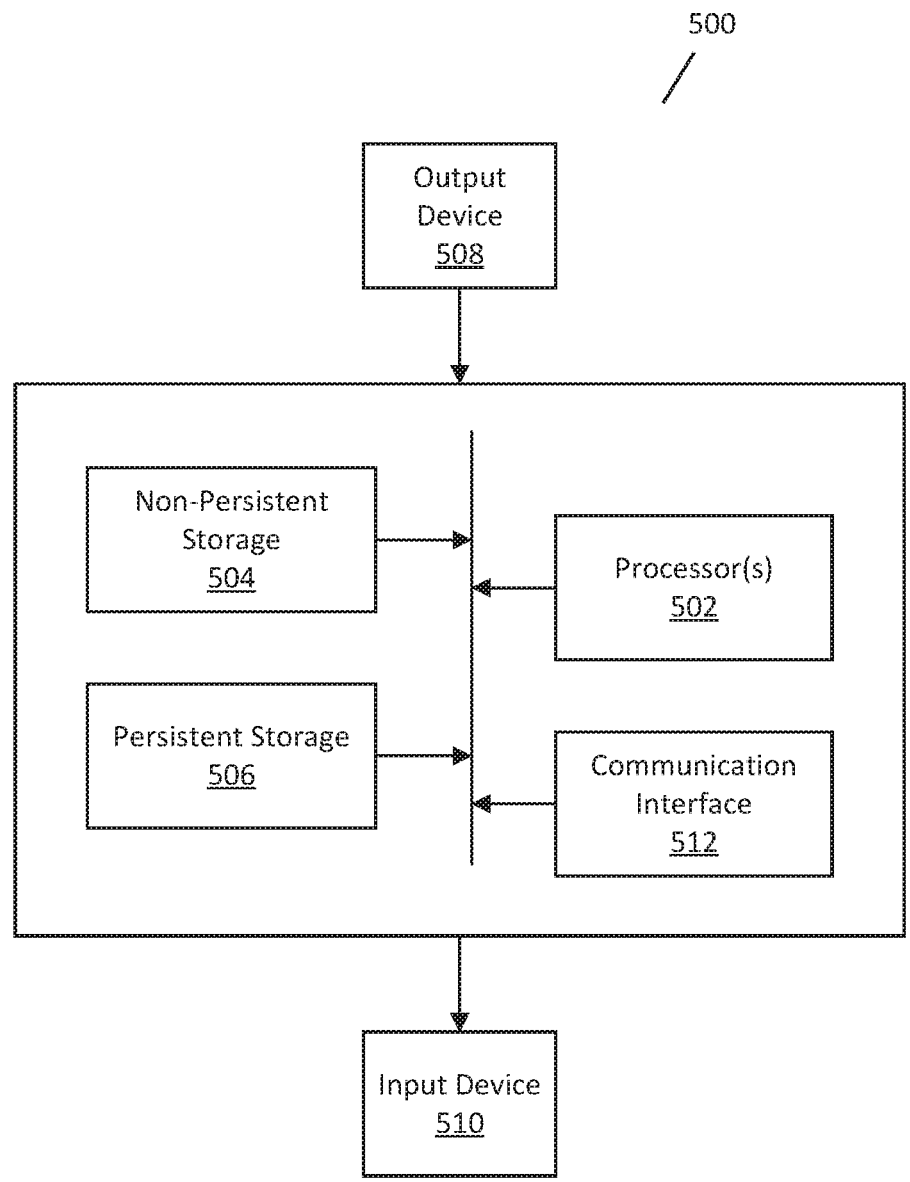
FIG. 5 shows a diagram of a computing device in accordance with one or more embodiments of the invention.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

The problems discussed above should be understood as being examples of problems solved by embodiments of the invention of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for asset classification, the method comprising:
   identifying, in a backup domain, assets comprising a first asset and a second asset, wherein the assets are identified using a scheme for identifying logical units of one or more data structures;
   performing a first analysis of the first asset to determine a set of first asset characteristics;
   performing a second analysis of the second asset to determine a set of second asset characteristics, wherein an asset management device analyzes the first asset and the second asset, wherein an entirety or a portion of the first asset and of the second asset is stored on one or more computing device nodes in the backup domain, wherein job components are created for the assets when portions of an asset among the assets is stored on different ones of the one or more computing device nodes, wherein the job components represent the asset and are used by the asset management device to perform a functionality of the asset;
   creating a first asset group based on the first analysis and the second analysis, the first asset group comprising the first asset and the second asset, wherein the job components are grouped based on characteristics of each of the job components; and
   assigning a first backup policy among one or more backup policies to the first asset group, wherein the one or more computing device nodes in the backup domain perform backup services based on the one or more backup policies assigned to each of the job components created for the assets stored on the one or more computing device nodes based on a priority matrix.

2. The method of claim 1, further comprising:
   identifying, in the backup domain, a third asset;
   performing a third analysis of the third asset to determine a set of third asset characteristics;
   creating a second asset group based on the third analysis; and
   assigning a second backup policy among the one or more backup policies to the second asset group.

3. The method of claim 2, wherein the first asset, the second asset, and the third asset are stored on a same computing device.

4. The method of claim 2, wherein:
   the third asset comprises a first portion stored on a first computing device, and
   a second portion stored on a second computing device,
   the first asset is stored on the first computing device,
   the second asset is stored on the second computing device, and the method further comprises:
creating a first job component of the job components associated with the first portion on the first computing device; and
creating a second job component of the job components associated with the second portion on the second computing device,
wherein the second asset group comprises the first job component and the second job component.

5. The method of claim 2, wherein the first analysis, the second analysis, and the third analysis determine, for each of the first asset, the second asset, and the third asset:
an operating system associated with each asset; and
an assigned backup policy among the one or more backup policies associated with each asset.

6. The method of claim 5, wherein the first analysis, the second analysis, and the third analysis further determine, for each of the first asset, the second asset, and the third asset:
a data access rate for each asset;
a memory usage for each asset; and
a data density for each asset.

7. The method of claim 1, wherein:
the first backup policy comprises at least one selected from a group consisting of a backup timing setting and a backup storage type.

8. A non-transitory computer readable medium comprising computer readable program code, which when executed by a computer processor enables the computer processor to perform a method for asset classification, the method comprising:
identifying, in a backup domain, assets comprising a first asset and a second asset, wherein the assets are identified using a scheme for identifying logical units of one or more data structures;
performing a first analysis of the first asset to determine a set of first asset characteristics;
performing a second analysis of the second asset to determine a set of second asset characteristics, wherein an asset management device analyzes the first asset and the second asset, wherein an entirety or a portion of the first asset and of the second asset is stored on one or more computing device nodes in the backup domain, wherein job components are created for the assets when portions of an asset among the assets is stored on different ones of the one or more computing device nodes, wherein the job components represent the asset and are used by the asset management device to perform a functionality of the asset;
creating a first asset group based on the first analysis and the second analysis, the first asset group comprising the first asset and the second asset, wherein the job components are grouped based on characteristics of each of the job components; and
assigning a first backup policy among one or more backup policies to the first asset group, wherein the one or more computing device nodes in the backup domain perform backup services based on the one or more backup policies assigned to each of the job components created for the assets stored on the one or more computing device nodes based on a priority matrix.

9. The non-transitory computer readable medium of claim 8, wherein the method further comprises:
identifying, in the backup domain, a third asset;
performing a third analysis of the third asset to determine a set of third asset characteristics;
creating a second asset group based on the third analysis; and
assigning a second backup policy among the one or more backup policies to the second asset group.

10. The non-transitory computer readable medium of claim 9, wherein the first asset, the second asset, and the third asset are stored on a same computing device.

11. The non-transitory computer readable medium of claim 9, wherein:
the third asset comprises a first portion stored on a first computing device, and
a second portion stored on a second computing device,
the first asset is stored on the first computing device,
the second asset is stored on the second computing device,
and the method further comprises:
creating a first job component of the job components associated with the first portion on the first computing device; and
creating a second job component associated of the job components with the second portion on the second computing device,
wherein the second asset group comprises the first job component and the second job component.

12. The non-transitory computer readable medium of claim 9, wherein the first analysis, the second analysis, and the third analysis determine, for each of the first asset, the second asset, and the third asset:
an operating system associated with each asset; and
an assigned backup policy among the one or more backup policies associated with each asset.

13. The non-transitory computer readable medium of claim 12, wherein the first analysis, the second analysis, and the third analysis further determine, for each of the first asset, the second asset, and the third asset:
a data access rate for each asset;
a memory usage for each asset; and
a data density for each asset.

14. The non-transitory computer readable medium of claim 8, wherein:
the first backup policy comprises at least one selected from a group consisting of a backup timing setting and a backup storage type.

15. A system for asset classification, the system comprising:
a processor;
a memory device;
a non-volatile storage device; and
an asset management agent executing on the processor and configured to:
identify, in a backup domain, assets comprising a first asset and a second asset, wherein the assets are identified using a scheme for identifying logical units of one or more data structures;
perform a first analysis of the first asset to determine a set of first asset characteristics;
perform a second analysis of the second asset to determine a set of second asset characteristics, wherein an asset management agent analyzes the first asset and the second asset, wherein an entirety or a portion of the first asset and of the second asset is stored on one or more computing device nodes in the backup domain, wherein job components are created for the assets when portions of an asset among the assets is stored on different ones of the one or more computing device nodes, wherein the job components represent the asset and are used by the asset management agent to perform a functionality of the asset;

create a first asset group based on the first analysis and the second analysis, the first asset group comprising the first asset and the second asset, wherein the job components are grouped based on characteristics of each of the job components; and assign a first backup policy among one or more backup policies to the first asset group, wherein the one or more computing device nodes in the backup domain perform backup services based on the one or more backup policies assigned to each of the job components created for the assets stored on the one or more computing device nodes based on a priority matrix.

16. The system of claim 15, wherein the asset management agent is further configured to:

identify, in the backup domain, a third asset;

perform a third analysis of the third asset to determine a set of third asset characteristics;

create a second asset group based on the third analysis; and assign a second backup policy among the one or more backup policies to the second asset group.

17. The system of claim 16, wherein the first asset, the second asset, and the third asset are stored on a same computing device.

18. The system of claim 16, wherein:

the third asset comprises a first portion stored on a first computing device, and a second portion stored on a second computing device, the first asset is stored on the first computing device, the second asset is stored on the second computing device, and the asset management agent is further configured to:

create a first job component of the job components associated with the first portion on the first computing device; and create a second job component of the job components associated with the second portion on the second computing device, wherein the second asset group comprises the first job component and the second job component.

19. The system of claim 16, wherein the first analysis, the second analysis, and the third analysis determine, for each of the first asset, the second asset, and the third asset:

an operating system associated with each asset;

an assigned backup policy associated with each asset;

a data access rate for each asset;

a memory usage for each asset; and a data density for each asset.

20. The system of claim 15, wherein:

the first backup policy comprises at least one selected from a group consisting of a backup timing setting and a backup storage type.

* * * * *